W. E. SMILEY.
PINCH BAR.
APPLICATION FILED SEPT. 16, 1919.
1,329,436.
Patented Feb. 3, 1920.
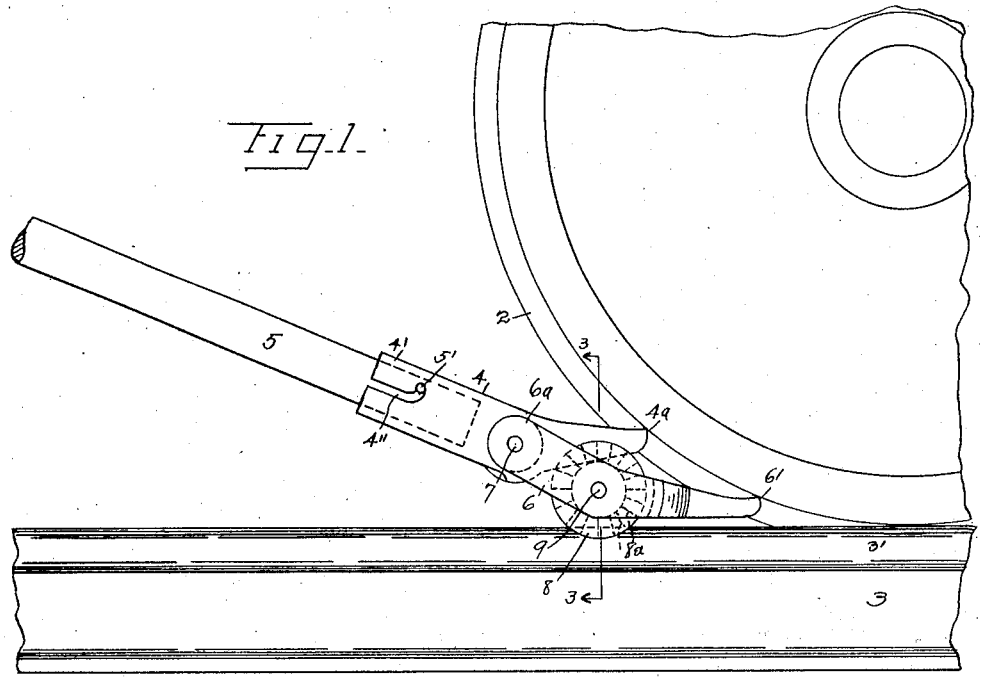
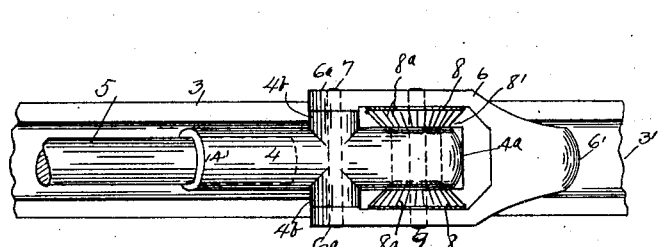
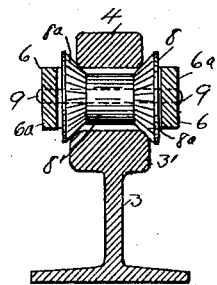
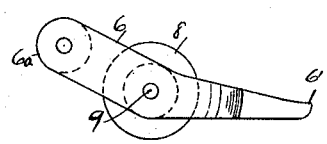
INVENTOR.
William E. Smiley.
BY
Harry De Wallace
ATTORNEY.

UNITED STATES PATENT OFFICE.

WILLIAM E. SMILEY, OF CAZENOVIA, NEW YORK.

PINCH-BAR.

1,329,436.    Specification of Letters Patent.    Patented Feb. 3, 1920.

Application filed September 16, 1919. Serial No. 324,069.

*To all whom it may concern:*

Be it known that I, WILLIAM E. SMILEY, a citizen of the United States, residing at Cazenovia, in the county of Madison and State of New York, have invented certain new and useful Improvements in Pinch-Bars, of which the following is a specification.

This invention relates to improvements in pinch bars, designed particularly for moving cars and the like, and has for its object to provide a novel, simple and highly effective device of the class, consisting of a main and an auxiliary lever which are pivotally mounted on a sheave-like fulcrum, the groove in the latter straddling the top of the rail and provided with means for preventing the device from slipping while employed for moving or locking a car. A further object is to provide a pinch bar which may be disposed beneath a car wheel and left there for preventing the car from moving by gravity or otherwise, while the same is being loaded or unloaded. And a further object is to generally improve and simplify the construction and operation of manually operated car movers.

I attain these objects by the means set forth in the detailed description which follows, and as illustrated by the accompanying drawing, in which—

Figure 1 is a side elevation of my improved pinch bar applied to a car wheel. Fig. 2 is a top-plan view of the same. Fig. 3 is a vertical cross-section, taken on line 3—3 of Fig. 1. And Fig. 4 is a side view of the auxiliary pinching member, which supports the main pinching member and is supported by the fulcrum wheel.

In the drawing, 2 is a car wheel, which operates on a track 3.

My pinch bar consists of a main pinching member 4, the rear-end of which is provided with a socket into which is detachably inserted a handle 5, the latter being held in place by a bayonet fastener comprising a pin 5' carried by the handle and a slot 4' formed in the end of the member 4. The forward end of the member 4 is formed into a relatively sharp nose 4$^a$, which engages the tread surface of the wheel 2. Midway between its opposite ends the lever 4 is provided with laterally projecting perforated bosses 4$^b$. 6 is the auxiliary pinching member, the forward end of which comprises the pinching nose 6', the rear-end thereof being forked, and the ends of the arms 6$^a$ being perforated. The main lever 4 is pivoted in the rear-end of the yoke 6$^a$ by a pin 7, which serves as the fulcrum and sustains the entire weight and strain of the main lever 4 during the pinching operations. The levers 4 and 6 are pivotally supported by a grooved wheel 8, which serves as the main fulcrum for the pinch bar, the said wheel being pivoted in the yoke of the member 6 by a pin 9. The axis of the wheel 8 is positioned about the middle of the member 6, and the nose-end of the member 4 normally lies in the top portion of the groove 8' and projects slightly beyond the wheel 8. The inner faces of the chines of the wheel 8 are beveled and arranged to operatively fit rails 3 of different breadths, and these beveled faces are provided with sharp teeth, shown conventionally at 8$^a$, which bite into the upper corners 3' of the bead of the rail when pressure is exerted upon the pinch bar for moving a car, and thereby prevent the bar from slipping on the rail 3. The wheel 8 is arranged to engage the corners 3' of the rail, because the said corners are much softer than the top face of the rail, which is hardened and polished by the action of the car wheels, and does not afford a suitable purchase for the teeth 8$^a$. When the pressure or weight upon the pinch bar is relieved, the device may be trundled along the top of the rail in either direction by the rotation of the wheel 8. The wheel 8 being free to rotate, as described, its point of contact with the rail naturally becomes frequently shifted, thereby distributing the wear upon the teeth 8$^a$, and thus prolonging the efficient life of the wheel.

A further and valuable feature of the invention consists of its employment for locking a car after the same has been moved. Heretofore, it has been the practice for someone to climb upon a car and set the brakes, or else place a block of some kind between the car wheel and the rail, for temporarily holding the car in the desired position. To obviate the aforesaid trouble and labor in a novel and simple manner, the operator, after the car has been moved, simply reinserts the pinching members 4 and 6 into the crotch of the wheel 2 and the rail 3 and leaves the device there, and then as a precautionary measure, he detaches the handle 5, so as to prevent tampering with, or displacement of the pinch bar. This effectually locks the car from movement in the opposite direction until the handle is replaced and depressed for releasing the bar. By leaving the pinch bar in the locking position, as described, the weight of the car bears upon the nose $4^a$ and forces the forward end of the member 4 tightly into the groove 8' of the wheel, against the sharp teeth $8^a$. This effectually holds the said wheel from rotation in either direction, because, at the same time, the teeth $8^a$ at the underside of the groove 8' are biting into the corners 3' of the rail. By this provision and arrangement, the wheel 8 can neither rotate nor slip on the rail, as long as the car wheel exerts pressure upon the nose $4^a$.

Obviously some changes or modifications may be made in the parts of the device within the scope defined by the appended claims, without departing from the spirit of the invention.

Having thus described my invention, what I claim as new and desire to secure by Letters Patent, is—

1. The combination of a wheel having a groove adapted to receive the bead of a rail, the flanges of said wheel having sharp teeth which bite the corners of the bead, a pinching member having a yoke in which said wheel is journaled, and a main pinching member pivoted in said yoke, the forward end thereof normally disposed in the top portion of said groove, the rear-end of the main member having a socket to receive a detachable handle.

2. In a pinch bar, a main pinching member having a nose at one end, the opposite end having a socket, an auxiliary pinching member, one end of said member being forked and pivotally receiving the main member, the opposite end having a nose, and a fulcrum wheel journaled in said fork beneath the nose-end of the main member, the chines of said wheel provided with sharp teeth adapted to bite the corners of a rail during the pinching operations.

3. A pinch bar comprising a main and an auxiliary member, the latter having a yoke in which the main member is pivoted, the forward end of each of said members having a nose adapted to engage the face of a car wheel, a grooved wheel journaled in said yoke between the pivot of the main lever and the nose of the auxiliary member, the groove in said wheel adapted to fit the beads of rails of different breadth and having its chines provided with sharp corrugations adapted to bite into the corners of the rail and also the underside of the main member when the weight of a car bears upon the nose of said main member for locking said grooved wheel from rotation, and said grooved wheel adapted to support the entire weight of the pinch bar and to permit said bar to be trundled on the rail toward and away from the car wheel.

In testimony whereof I affix my signature.

WILLIAM E. SMILEY.